Dec. 30, 1930.   N. A. B. ODOM   1,787,121
INTERNAL COMBUSTION ENGINE
Filed July 6, 1929   2 Sheets-Sheet 2

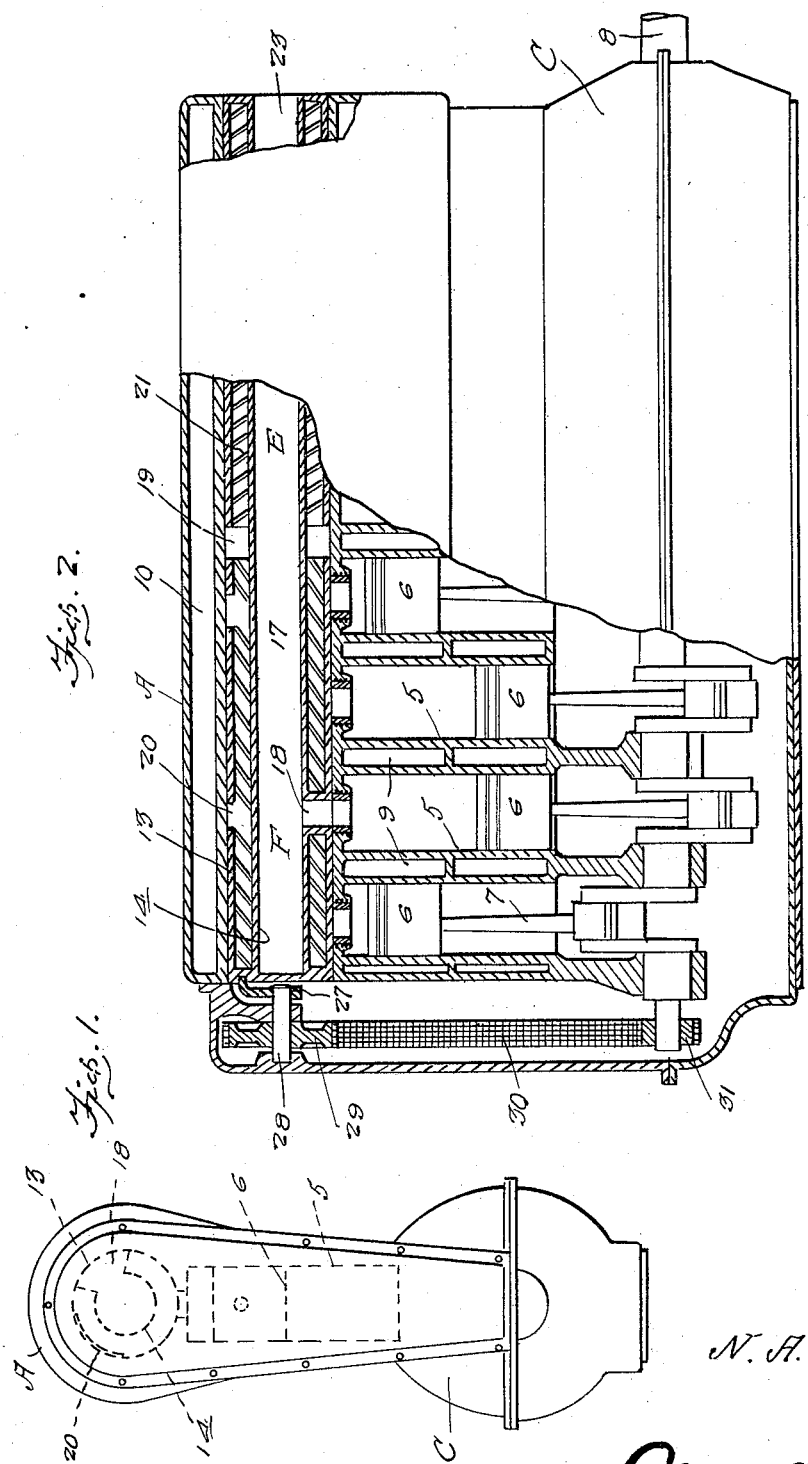

Inventor
*N. A. B. Odom*

By *Clarence A. O'Brien*
Attorney

Patented Dec. 30, 1930

1,787,121

UNITED STATES PATENT OFFICE

NICHOLAS A. B. ODOM, OF SAN ANTONIO, TEXAS

INTERNAL-COMBUSTION ENGINE

Application filed July 6, 1929. Serial No. 376,447.

This invention relates to internal combustion engines, particularly those of the rotary valve type and has as its principal object the provision of certain new and useful improvements in the construction of the rotary valve, which will be simple in action, easy to manufacture, and whereby through the rotation of the valve, a whirlwind motion will be imparted to the incoming fuel for distribution to the various cylinders and the burnt or exhaust gases delivered therefrom with the same whirlwind motion, thus greatly enhancing a valve of this type.

Another very important object of the invention is to provide a rotary valve of the type described, whereby the heat from the exhaust together with the whirling motion will evaporate the fuel, thus eliminating raw fuel from entering the combustion chamber, the advantage of which will produce a saving in fuel with an increase in power, higher speed and in many other ways prove advantageous over other known valves of this type.

With the above and numerous other objects in view, as will become apparent during a study of the following description, taken in connection with the accompanying drawings, the invention consists in a novel construction, arrangement and operation herein to be described more in detail.

In the drawings:

Figure 1 is an end view of an internal combustion engine constructed in accordance with this invention.

Figure 2 is a fragmentary view partly in section and partly in elevation of an internal combustion engine constructed in accordance with this invention.

Figure 3:
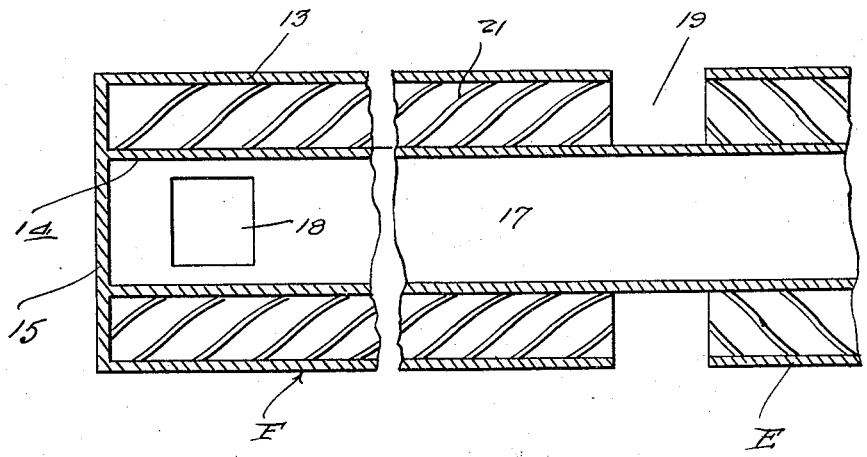
Figure 3 is a fragmentary longitudinal vertical section taken through the rotary valve constructed in accordance with this invention.

In the drawings, I have illustrated in conventional form the upper portion of an eight cylinder internal combustion engine, the cylinders of which are indicated at 5, in which pistons 6 are adapted to reciprocate, having piston rods 7, connected in the usual manner with a conventional crank shaft 8. As illustrated the cylinders 5 are of the conventional double wall type, so as to provide the suitable water jacket 9.

In carrying out the present invention, I employ a multiple cylinder head designated generally as at A, said cylinder head being common to all of the cylinders 5, the said cylinder head being suitably water jacketed as at 10.

The valve casing 11 constitutes a semi-cylindrical wall which extends throughout the entire length of the multiple cylinder head and is formed integrally with the cylinder wall, the said casing being provided at the outer end of the combustion chamber of each of the cylinders 5 and forms therewith a single port 11, which constitutes a single intake port or exhaust port.

As illustrated the head A is formed integral with the crank case C, which as shown is preferably of the two part construction.

Figure 4:
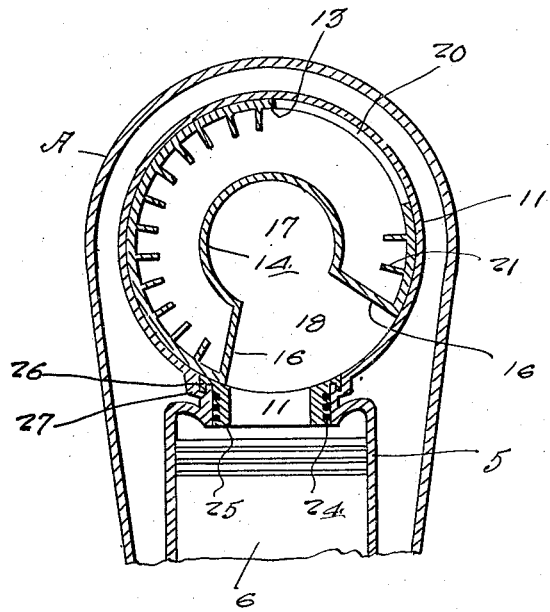
Figure 4 is a cross sectional view through the rotary valve and one of the cylinders at the port from said cylinder showing the same opening into the exhaust passage of the rotary valve.

Within the valve casing the rotary valve is fitted, said valve comprising an outer wall 13 and an inner wall or sleeve 14 and an end wall 15. The inner and outer walls 13 and 14 are united at intervals by vertical walls 16—16, constituting a port in the rotary valve through its walls through the inner or exhaust passages 17. Thus is provided a plurality of receiving or collecting ports 18, as clearly shown to advantage in Figure 4. Intermediate its ends, the outer shell is provided with a suitable intake port, or as to be hereinafter termed a supply port 19.

The port 19 will of course have suitable connection with the carburetor whereby it will be seen that the gas drawn into the rotary valve will flow therethrough toward the right and toward the left end of the valve between the inner and outer walls thereof as will be clear from a study of Figures 2 and 3. The outer wall 13 of the valve is also provided with a plurality of suitable supply or distributing ports 20, in proper position and of appropriate extent to register with the port 11 during the rotation of the valve so as to be timed properly for the operation of the respective cylinders and proportional to the exhaust ports 18.

On the inner face of the outer wall 13 there is provided a plurality of spiral ribs or veins 21 and as illustrated the veins in the rotary valve sections denoted generally by the reference character F are in a line of direction corresponding to the direction of flow of the incoming fuel, while in the section E of the rotary valve, the same formed therein are in a line of direction opposite to the veins in the first mentioned section and consequently in line with the direction of flow of that part of the fuel directed into said section. In operation, then, it will be seen that during the rotation of the rotary valve, a supply of fuel is admitted into the annular, single intake passage 19, to be directed into the respective sections E and F to flow therethrough in a whirling motion as will be effected through the medium of the veins 21, the supply port 20 coming into register with the proper cylinder 5 to admit a supply of fuel into the interior of the said cylinder upon the downward or suction stroke of the piston therein, while further rotation of the valve closes the port 11, maintaining the same closed, during the compression and firing of the charge so drawn in under the usual actuation of the upward and downward reciprocation of the respective piston, whereupon the exhaust port 18 is brought into register with the said port 11, to conduct the exhaust gases into the exhaust passage 17 to be discharged from said passage 17 at one end of the valve through the exhaust or outlet port 23. The said ports 23 are formed communicating with the atmosphere or with a suitable muffler as may be desired at one end of the engine as clearly shown in Figure 2.

As is a well known fact, the most important defects of this type of internal combustion engine is a loss of compression on the power as well as on the compression stroke, for when the valves are closed, compression or power forces the rotary valve up against the upper portion of the casing of the rotary valve, leaving enough space at the cylinder port, that is, the port in this case 11 to allow power to escape. To overcome this defect, I provide each of the ports 11 with suitable sleeve rings 24, disposed about and carried by suitable sleeves 25 located within the respective ports 11, as shown to advantage in Figure 4.

These sleeves 25 are disposed within the respective ports 11 so as to be slidable therein, so that on compression and power strokes, the core forces the sleeves up against the rotary valve as will be apparent. It is to be noted that at the upper periphery, the rings 25 are so formed as to provide a suitable seat for the rotary valve, having the upwardly inclined laterally flange like portions 26, against the under face of which springs 27 suitably arranged about the ports and ring are set, for opening the ring against the rotary valve, for urging the sleeve up against the rotary valve. This of course will prevent any loss of power, since the sleeve, owing to the pressure from the cylinder chamber being urged against the rotary valve, the chance of any leakage occurring when the rotary valve is at a position closing the port 11 is negligible. At that position the valve would, of course, be urged up against the upper portion of the casing of the rotary valve, as it is the position of compression or power stroke of the pistons.

The spiral ribs or veins 21, besides providing an improved means of feeding the incoming gases or fuel through the respective cylinders will also have a tendency to keep an even amount of fuel at each port at the same time, thus giving a better mixture and at the same time will tend to cool the valve owing to the cold air and fuel from the carburetor passing from vein to vein during its flow through the rotary valve. These veins also make for a stronger rotary valve, guarding against warping of the valve and similar other defects apt to occur during use.

A valve of this type will be further rendered more desirable in view of its use with a sleeve port as is constituted through the medium of the sleeve 25 and about its parts, the same allowing the rotary valve a loose working fit eliminating friction and overheating. Such construction will, of necessity, permit of proper lubrication.

At the closed end of the valve there is provided a suitable arm member 27, suitably fixed to a shaft 28, suitably journaled for rotation within the engine casing as illustrated. Upon said shaft 28 is mounted a wheel 29, whereby the driving of the rotary valve may be accomplished through the medium of a silent chain 30, passing around the wheel 29 and also around a second wheel 31, on the crank shaft 8.

From the foregoing then, it will be seen that I have provided a suitable rotary valve for internal combustion engines, the latter comprising any number of cylinders and with which the said valve may be associated with ready adaptability.

It will be also seen that such a valve as herein described and illustrated may be manufactured and maintained at a relatively small cost, is simple in construction, durable, thoroughly reliable, practical, efficient and otherwise well adapted for the purpose for which it was designed.

It is also to be understood that the present embodiment of the invention as herein illustrated is merely by way of exemplification, since in actual practice, the invention is susceptible to certain changes fully comprehended by the spirit of the same and the scope of the appended claims.

What is claimed is:

1. In an internal combustion engine, a hollow rotary tubular valve closed at one end and opened at its opposite end for communication with the atmosphere, said valve comprising spaced inner and outer concentric walls, the space between said walls constituting a longitudinally extending intake gas passage closed at opposite ends of the valve, the outer wall of said valve being provided with an annular intake port intermediate the ends of the valve for communication with said passage, said outer wall being further provided with an exhaust port for each cylinder of the internal combustion engine, said inner walls being provided with an exhaust port for each cylinder, said exhaust port extending through said passage and opening outwardly of said outer wall for communication with the cylinders, a spiral rib formed on the inner face of said outer wall extending from one side of said single intake port to one closed end of said passage, a second spiral rib extending from the other side of said single intake port to the other closed end of said passage, said spiral ribs having their outer edges in spaced relation to said inner wall of the valve.

2. In an internal combustion engine, a hollow rotary tubular valve closed at one end and opened at its opposite end for communication with the atmosphere, said valve comprising spaced inner and outer concentric walls, the space between said walls constituting a longitudinally extending intake gas passage closed at opposite ends of the valve, the outer wall of said valve being provided with an annular intake port intermediate the ends of the valve for communication with said passage, said outer wall being further provided with an exhaust port for each cylinder of the internal combustion engine, said inner walls being provided with an exhaust port for each cylinder, said exhaust port extending through said passage and opening outwardly of said outer wall for communication with the cylinders, a spiral rib formed on the inner face of said outer wall extending from one side of said single intake port to one closed end of said passage, a second spiral rib extending from the other side of said single intake port to the other closed end of said passage, said spiral ribs having their outer edges in spaced relation to said inner wall of the valve, said rib spiralling in the direction of flow of the incoming gas toward the opposite closed end of said passage for directing the gas in a whirling manner toward the respective supply port.

In testimony whereof I affix my signature.

NICHOLAS A. B. ODOM.